Feb. 15, 1966  O. J. KING  3,234,744
METHOD AND APPARATUS FOR SEPARATING COMPONENTS OF GAS MIXTURES
Filed Jan. 18, 1963  2 Sheets-Sheet 1

INVENTOR
O. J. King

BY  John O. Evans, Jr.
ATTORNEY

INVENTOR
O. J. King

United States Patent Office 3,234,744
Patented Feb. 15, 1966

3,234,744
METHOD AND APPARATUS FOR SEPARATING COMPONENTS OF GAS MIXTURES
O. J. King, Odessa, Tex., assignor to Mercury Development Co., Midland, Tex., a corporation of Texas
Filed Jan. 18, 1963, Ser. No. 252,396
3 Claims. (Cl. 62—40)

This invention relates to a method and apparatus for separating components of gas mixtures involving cooling of the gas mixture to condense the condensable components of the gas and separating the condensed liquid from the uncondensed gases. More particularly, the invention relates to a method and apparatus for separating natural gas, as drawn from a gas well, containing water vapor, liquifiable hydrocarbon components, and non-liquifiable gases into recoverable components of commercial value.

In small, isolated oil or gas fields that are located many miles from a gas gathering pipeline, it may not be economically feasible to lay a gas line from the field to the main gas gathering system. In such circumstances, the natural gas obtained from the well or wells is either flared or vented to the atmosphere and is lost forever.

In large fields, conventional extraction units of large capacity may be installed and operated economically to remove water and higher boiling hydrocarbon components, such as propane, butane, hexane, pentane, gasoline, etc., from natural gas prior to piping the non-condensable gas fractions into the gas collection system. The dehydration of natural gas is one of the most expensive stages of processing the gas in such conventional extraction units.

The present invention provides a method and apparatus for dehydrating natural gas and condensing higher boiling hydrocarbon fractions therefrom that is economical to operate with relatively small amounts of natural gas such as are found in small, remote fields. The method and apparatus of the invention may also be used to advantage for preliminarily scrubbing larger volumes of natural gas fed to conventional, large capacity, extraction units. Capacity may be increased by operating a number of units in parallel.

An object of the invention is to provide apparatus and a method for extracting and reclaiming water and liquifiable hydrocarbons from natural gas.

Another object of the invention is to provide such apparatus and a method wherein the natural gas is chilled to condense liquifiable fractions therefrom by means of a refrigeration unit powered by natural gas, or natural gas processed in accordance with the invention.

Another object is to provide apparatus for extracting water and liquifiable hydrocarbons from natural gas that is economical to make and operate, that is highly efficient in operation, and that requires a minimum of maintenance and service.

The foregoing and other aims, objects and advantages of the invention are achieved in apparatus for separating condensable gas components from a gas mixture, such as natural gas, containing condensable and non-condensable gas components which includes a refrigerant tank and a continuous tubular coil having portions that pass through the tank and portions disposed outside of the tank. The portions of the coil that pass through the tank are of narrow internal diameter and the portions disposed outside of the tank are of wider internal diameter. Means are provided for cooling the refrigerant tank, for withdrawing condensate from the coil and for passing a stream of gas mixture to be treated through the coil. Preferably, the refrigerant tank is cooled by an absorption refrigerator unit using natural gas as the source of power for operating the unit. A liquid trap, including a float-valve, may be used for withdrawing condensate from the coils without affecting pressure conditions inside the coil. Other apparatus components may be used in conjunction with the foregoing apparatus, as will be more fully set forth in the detailed description of the invention given hereinafter.

In one of its method aspects, the invention includes passing natural gas or the like in indirect heat exchange relation with the evaporating refrigerant of a hermetically sealed, absorption refrigeration system to cool the gas to condense water vapor and liquifiable hydrocarbons therefrom, separating the condensate from the gas, and burning a portion of the separated gas to heat the generator of the refrigeration system. Another portion of the cooled, separated gas may be passed in indirect heat exchange relation with the natural gas to precool the latter prior to its being passed in indirect heat exchange relation with the refrigerant.

In another method aspect, the invention includes establishing a continuous stream of natural gas or the like having a plurality of zones of alternately high and low velocity, cooling the stream in the zones of high velocity to condense liquifiable gas components therefrom, maintaining the stream in the zones of high velocity at a velocity sufficient to retain the condensate substantially entrained in the gas stream, maintaining the stream in the zones of low velocity at a velocity sufficient to permit condensate to precipitate from the gas stream, and withdrawing condensate from the zones of low velocity.

Further features of the invention will appear in the following detailed description of an embodiment of the invention shown in the drawings in which.

Figure 1:
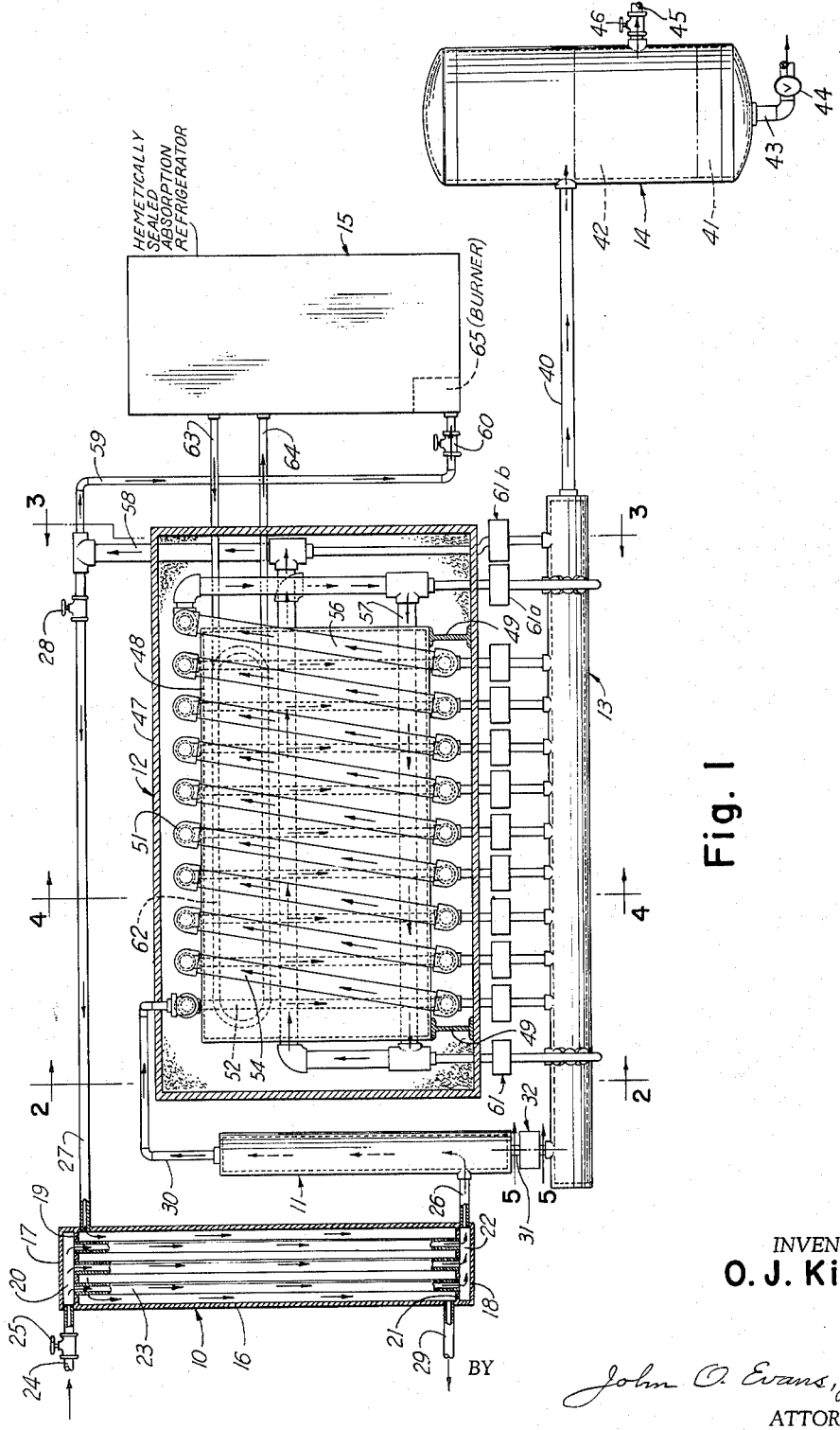
FIG. 1 is an elevational view of one form of apparatus embodying the invention, parts of the apparatus being shown in section.
Figure 2:
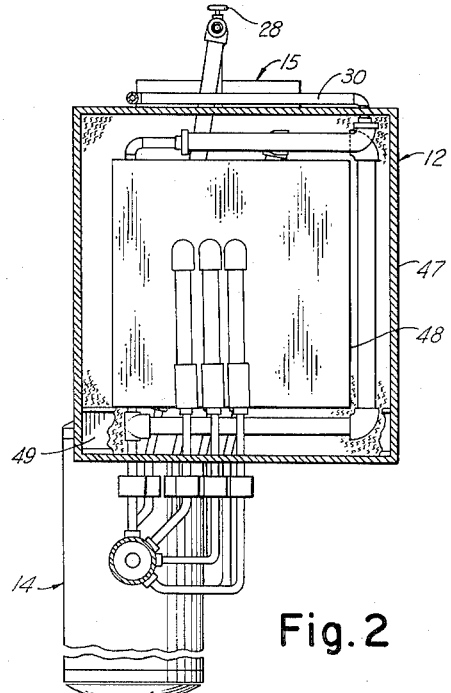
FIG. 2 is a sectional view taken along the line 2—2 of FIG. 1.
Figure 3:
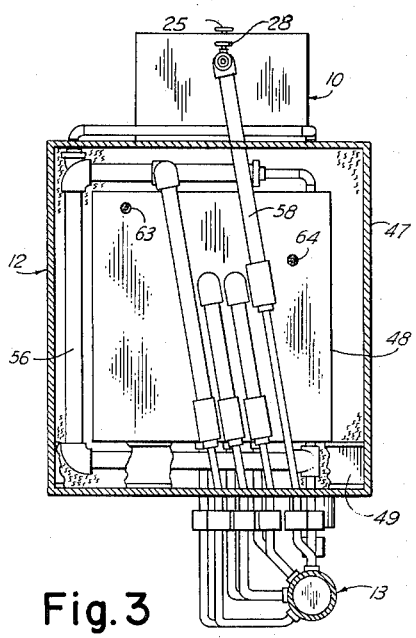
FIG. 3 is a sectional view taken along the line 3—3 of FIG. 1.
Figure 4:
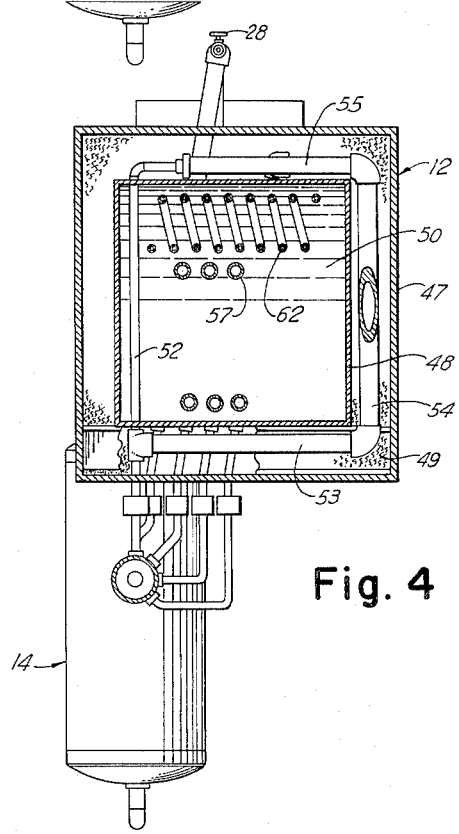
FIG. 4 is a sectional view taken along the line 4—4 of FIG. 1.

Referring to the drawings, particularly to FIG. 1, the apparatus shown includes a precooler in the form of an indirect heat exchanger 10, a liquid-gas separator 11, a chiller-cooler unit 12, a liquid collection header 13, a liquid-liquid separator 14, and an absorption refrigerator unit 15.

The indirect heat exchanger 10 has an outer cylindrical shell 16 provided with upper and lower end closure plates 17 and 18. A transverse partition plate 19 near the top of the heat exchanger provides, with the upper portion of the heat exchanger, an upper inlet header 20. A similar partition plate 21 provides, with the lower portion of the heat exchanger, a lower header 22. Heat exchanger tubes 23, within the shell 16, connect the upper header 20 with the lower header 22. An inlet pipe 24 admits natural gas, or other gas containing liquifiable components, to the upper header under control of a valve 25. The gas flows from the upper header to the lower header through the tubes 23. The lower header has an outlet conduit 26 connecting it to the lower part of the liquid-gas separator 11. Gas for precooling, by indirect exchange of heat, the natural gas in the tubes 23 is introduced into the precooler by a conduit 27, under control of a valve 28, and is exhausted from the precooler through pipe 29.

The liquid-gas separator 11 is a vertical cylindrical tank through which precooled natural gas flows upwardly at a low velocity from the conduit 26. Gas is discharged at the top of the separator into a pipe 30, through which it is passed to the chiller-cooler unit 12. The interior of the separator may be filled with packing if desired. Condensate that forms in the precooler and that is separated from the gas stream in the separator gravitates to the bottom of the separator and flows down through the draw pipe 31 into a trap 32.

Figure 5:
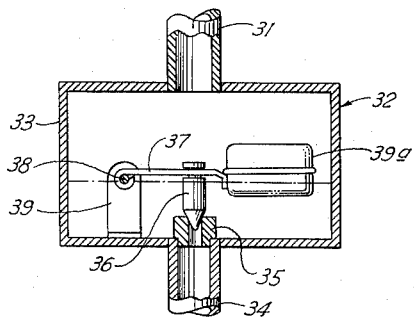
FIG. 5 is a vertical sectional view, somewhat enlarged, taken along the line 5—5 of FIG. 1.

The trap is shown in enlarged vertical sectional view in FIG. 5. It has a liquid collection box 33 that is enclosed and is provided with an outlet tube 34 at the bottom. A float valve arrangement in the box includes a valve seat 35 closed by a valve 36 carried by arm 37. One end of the arm is pivoted at 38 to a post 39 fixed to the box. The other end of the arm carries a float 39a. When liquid accumulates in the box to a height sufficient to raise the float, the valve is lifted off the valve seat and liquid flows out of the box into the tube 34. When the liquid level drops sufficiently, the float falls to seat the valve and shut off the out-flow of liquid.

As seen in FIG. 1, liquid from the trap 32 flows down through the tube 34 into the liquid collection header 13, from which it passes through a conduit 40 into the liquid-liquid separator 14. In the separator, water and condensed hydrocarbons separate by gravity into a lower fraction 41 of water and an upper fraction 42 of liquid hydrocarbons. The water is periodically drawn off through a pipe 43 by opening the valve 44 and may be discarded. The liquid hydrocarbons similarly are withdrawn from the separator through a pipe 45 under control of a valve 46. These liquid hydrocarbons form a valuable product which is stored for sale, use, or other disposal.

Referring to FIGS. 1 through 4, the chiller-cooler unit 12 has an outer case 47 in the form of an enclosed box structure. Within the case and spaced from the walls thereof is a refrigerant tank 48 which is supported on I-beams 49, 49. The refrigerant tank is closed and is filled with a liquid refrigerating bath 50, such as a brine solution. The unit has a continuous tubular coil 51 wrapped around and through the refrigerant tank. Each turn of the coil has a chiller tube leg 52 extending vertically through the tank in contact with the refrigerating bath. These legs are made of narrow diameter pipe lengths. Each chiller tube is connected at its lower end to a lower, horizontal pipe section 53. This pipe section is connected to a substantially vertical pipe section 54 which, in turn, is connected to an upper, horizontal pipe section 55. This upper pipe section is joined to the chiller tube leg of the next turn of the coil 51. It is seen that the pipe sections 53, 54 and 55 are all of the same internal diameter and of an internal diameter which is larger than that of the chiller tube. These pipe sections form a U-shaped portion which is disposed in the space between the refrigerant tank and the outer case of the unit. The space between the tank and the case may be filled with a granular or fibrous heat-insulating material, such as rock wool. The U-shaped portion permits gas flowing therein to be in indirect heat exchange relation with the air and insulating material in the space between the tank and the case.

The last turn 56 of the coil 51 is connected to a final chiller coil 57 having three horizontal turns that are disposed largely within the refrigerant tank in contact with the refrigerating bath. The final chiller coil may be constructed of pipe having the same internal diameter as, or a slightly larger internal diameter than, the larger diameter pipe sections 53, 54 and 55 of the tubular coil 51. Effluent gas from the final chiller coil passes to an outlet pipe 58. Most of the effluent gas is cycled back through the conduit 27 to the precooler to cool the natural gas fed to the system. The remainder of the effluent gas is led to the burner 65 of the refrigerator unit 15 through the pipe 59, the latter having a valve 60. Cool, dry gas that leaves the system through the pipe 29 may be stored, sold, flared or otherwise disposed of.

Draw pipes, like draw pipe 31, conduct condensate from the lower horizontal pipe sections 53 to the liquid collection header 13 through traps and outlet tubes like the corresponding elements 32 and 34 through which condensate is withdrawn from the liquid-gas separator 11. Similar equipment 61, 61a and 61b is employed to withdraw condensate from the final chiller coil.

The absorption refrigerator unit 15 is conventional and, per se, forms no part of the present invention. It has the usual generator, evaporator coil, and absorber. The construction and operation of a typical absorption refrigerator unit suitable for use in the present invention are shown and described on page 6856 of "The World Book Encyclopedia," published by Field Enterprises, Inc., Chicago, Illinois, copyright 1953. The unit 15 of the present disclosure preferably is air-cooled, as is the typical unit referred to above. It may, however, have its condenser and absorber cooled by water, if desired. The gas burner 65 of the refrigerator unit may be controlled by a thermostatic controller (not shown) responsive to the temperature of the refrigerating bath 50 to maintain the bath at the desired temperature, in a manner well known in the art of refrigeration.

A refrigerant evaporator coil 62, forming the evaporator of the refrigerator unit 15, is immersed in the refrigerating bath 50 for cooling the latter. It is supplied with liquid ammonia through a tube 63 from the condenser of the refrigerating unit 15. The boiling of the ammonia in the evaporator coil cools the bath 50. Ammonia gas is returned to the absorber of the unit 15 through a tube 64.

In operation, natural gas, or other gas containing condensable components, is led from a source, such as a gas well, through the inlet pipe 24 into the upper header of the precooler 10. The gas flows down through the heat exchanger tubes 23, into the lower header 22 and is discharged through the outlet conduit 26. The feed gas is cooled in the tubes 23 by cold, dry gas from the conduit 27 that flows over the tubes and is exhausted through the pipe 29. Condensation of some of the water and the higher boiling point hydrocarbon components of the gas takes place in the precooler tubes. The resulting condensate leaves the precooler by way of the outlet conduit 26 and the condensate, together with the precooled gas, flows into the bottom of the liquid-gas separator 11.

In the separator, the condensate from the precooler flows to the bottom and the gas flows toward the top. Entrained condensate is removed from the gas stream and settles to the bottom. The condensed liquids flow into the trap 32 and are periodically and automatically flushed into the liquid collection header 13, as explained hereinbefore.

The gas from the separator 11 is subjected to further cooling and separation of condensate in the chiller-cooler unit 12. The gas is introduced into the chiller-cooler unit from pipe 30. It flows down through the first chiller tube leg 52 in which, because of the narrow diameter of the tube, gas velocity is relatively high. Therein, the gas is cooled by transfer of heat through the walls of the tube to the refrigerating bath 50. Water and hydrocarbon components are condensed from the gas in leg 52. However, owing to the high velocity of the gas in this leg, the condensate remains entrained in the gas and is carried out of the chiller tube leg into the first, lower, horizontal pipe section 53; the condensate does not collect in or freeze in the chiller tube. When the gas enters the pipe section 53, its velocity is sharply reduced because of the increased diameter of this pipe section in comparison to the diameter of the chiller tube leg. Condensate is precipitated in this pipe section and in the pipe sections 54 and 55 through which the gas stream successively flows. The temperature in the zone immediately surrounding the pipe sections 53, 54 and 55, while it is fairly low due to the proximity of the cold refrigerant tank 48, is not low enough to freeze the condensate that collects in these pipe sections. Condensate flows by gravity out of these pipe sections through a trap into the liquid-collection header 13. The gas passes from the first, upper, horizontal pipe section 55 into the second chiller tube leg 52, in which it is additionally cooled, and, thence, through the second U-shaped section of tubes 53, 54 and 55, in which it is subjected to further separation of condensate, the condensate being transferred to the liquid collection header through a trap. The gas is then conducted through the additional stages of chiller tube legs and separator pipes 53, 54 and 55, to the final chiller coil 57, through which it passes at low velocity to condense and precipitate the last condensable increment of lower boiling point hydrocarbons. Most of the cool dry gas is then recirculated to the precooler and a small part of it is used to provide fuel for the burner of the absorption refrigerator unit. It is, of course, possible to recirculate all of the gas from the final chiller coil through the precooler and to use a portion of the exit gas from the pipe 29 to provide fuel for the burner.

Condensate that collects in the header 13 flows to the liquid-liquid separator 14 where the liquid hydrocarbons are separated from the water and the liquid hydrocarbons are sent to storage or use.

As pointed out hereinbefore, the temperature of the refrigerating bath 50 may be maintained at the desired point by thermostatic control of the absorption refrigerator unit.

The rate of heat transfer from the chiller tubes and separator tubes may be controlled by proper choice of the material of the tubes (plastic or other low thermal conductivity material is used for low rates of heat transfer, metal for high rates), wall thickness of the tubes, length of the tubes, and the inside diameter of the tubes to control velocity of the gas.

In typical apparatus according to the invention, the refrigerant tank 48 is constructed of polyvinyl chloride plates having a thickness of 1/8". The dimensions of the tank are 16" x 12" x 12". The chiller tube legs 52 are made of polyvinyl chloride and have an inside diameter of 3/8" and a wall thickness of 0.3". The separator pipes 53, 54 and 55 are also made of polyvinyl chloride and have a wall thickness of 0.2" and an inside diameter of 3/4". The tubing of the final chiller coil 57 has an inside diameter of 1" and a wall thickness of 0.3". The absorption refrigerator unit 15 has a capacity of 0.1 ton of refrigeration.

By way of example, such typical apparatus has been operated using a feed gas consisting of separator gas from an oil well, the gas containing approximately 2.5 gallons of gasoline per 1000 cubic feet and approximately 1000 pounds of water vapor per million cubic feet. The temperature of the separator gas entering the precooler ranged from a high of 100° F. to a low of 40° F. and the temperature of the gas leaving the precooler ranged between 50° F. and 35° F.

The gas from the precooler was flowed through the liquid-gas separator and some water and gasoline was drawn off at this point. The liquid recovered was approximately 80% to 90% water with the balance being gasoline.

Gas from the liquid-gas separator was conducted through the chiller-cooler unit, the refrigerating bath of which was maintained at a temperature of from 10° F. to 20° F. The liquid withdrawn from the first turn of the coil in this unit was 70% to 80% water and 30% to 20% gasoline. The liquid withdrawn from the second turn of the coil was 40% to 50% water and 60% to 50% gasoline. The liquid withdrawn from the third, fourth, and fifth turns of the coil contained decreasing proportions of water and increasing proportions of gasoline. Liquid withdrawn from coil turns after the fifth was substantially all gasoline with a trace of water.

The temperature of the gas leaving the chiller-cooler unit was approximately the same as that of the refrigerating bath. Substantially all of the water vapor and about 40% of the gasoline contained in the feed gas were removed therefrom under the foregoing operating conditions.

The gas flow rate used in the foregoing example ranged from 5,000 to 500 cubic feet per day.

In the foregoing specific example, the pressure of the gas within the system was substantially atmospheric with only a few ounces of pressure differential between the inlet and outlet ends of the system to effect movement of the gas therethrough. However, the system may be operated under superatmospheric pressure with attendant greater recoveries of condensable hydrocarbons. It is contemplated that the method may be carried out at gas pressures within the system of up to 1000 pounds per square inch. The apparatus will, of course, be strengthened to withstand higher operating pressures. Also, lower temperatures may be used for the refrigerating bath which will allow increased flow of gas through the system; bath temperatures may range in practice from −40° F. to 30° F.

From the foregoing description, it is seen that the present invention achieves its aims and objects. It will be understood that various changes may be made in the specific details shown and described herein without departing from the spirit and scope of the invention.

I claim:

1. Apparatus for separating condensable gas components from a gas mixture containing condensable and non-condensable gas components which comprises:
 (a) an indirect heat exchanger for precooling said gas mixture;
 (b) a liquid-gas separator receiving cooled gas from said heat exchanger and separating condensate from the gas;
 (c) a chiller-cooler unit comprising a continuous tubular coil through which gas from said separator is passed;
 (d) means for withdrawing condensate from said coil;
 (e) an absorption refrigerator unit having an evaporator for cooling portions of said coil and a burner for firing the generator of said unit;
 (f) means for conducting a portion of the gas leaving said coil to the burner of said refrigerator unit; and
 (g) means for passing another portion of the gas leaving said coil to said indirect heat exchanger to precool said gas mixture.

2. Apparatus for separating condensable gas components from a gas mixture containing condensable and non-condensable gas components which comprises:
 (a) a refrigerant tank;
 (b) a continuous tubular coil having portions that pass through said tank and portions disposed outside of said tank, said portions that pass through said tank comprising tubular sections of narrow internal diameter and said portions disposed outside of said tank comprising tubular sections of wider internal diameter;
 (c) means for cooling said refrigerant tank comprising an absorption refrigerator unit the evaporator of which is disposed to cool said tank;
 (d) means for withdrawing condensate from said coil; and
 (e) means for passing a stream of said gas mixture through said coil.

3. Apparatus for separating condensable gas components from a gas mixture containing condensable and non-condensable gas components which comprises:
 (a) a refrigerant tank;

(b) a continuous tubular coil, each turn of which has a leg of narrow internal diameter that passes through said tank and a leg of larger internal diameter disposed outside of said tank;
(c) means for cooling said refrigerant tank comprising an absorption refrigeration unit the evaporator of which is disposed to cool said tank;
(d) liquid trap means communicating with said coil legs that are disposed outside of said tank, said liquid trap means including a float-valve for releasing liquid condensate from the trap to maintain a substantially constant level of liquid in the trap;
(e) means for passing a stream of said gas mixture through said coils; and
(f) means for conducting gas from said coil to the burner of said refrigerator unit.

References Cited by the Examiner
UNITED STATES PATENTS

| | | | |
|---|---|---|---|
| Re. 23,245 | 6/1950 | Atkeson | 62—40 XR |
| 2,679,145 | 5/1954 | Hagen. | |
| 2,704,274 | 3/1955 | Allison. | |
| 2,726,519 | 12/1955 | Squier | 62—27 |
| 2,742,407 | 4/1956 | Irvine | 62—40 |
| 2,884,763 | 5/1959 | Faulk | 62—40 |
| 2,907,175 | 10/1959 | Kohler | 62—40 |
| 2,909,905 | 10/1959 | Mitchell | 62—40 XR |
| 2,949,015 | 8/1960 | Fite | 62—40 |
| 2,989,853 | 6/1961 | Gilmore | 62—11 |
| 3,019,610 | 2/1962 | Pratt | 62—11 |

NORMAN YUDKOFF, *Primary Examiner.*